(12) United States Patent
Tarleton et al.

(10) Patent No.: US 8,149,417 B2
(45) Date of Patent: Apr. 3, 2012

(54) SYNCHRONOUS RADIATION HARDENED FIBER OPTIC GYROSCOPE

(75) Inventors: Norman Gerard Tarleton, Glendale, AZ (US); Stephan Enzone, Tempe, AZ (US); David A. Doheny, Clearwater, FL (US); Derek Mead, Scottsdale, AZ (US)

(73) Assignee: Honeywell International Inc., Morristown, NJ (US)

( * ) Notice: Subject to any disclaimer, the term of this patent is extended or adjusted under 35 U.S.C. 154(b) by 268 days.

(21) Appl. No.: 12/694,744

(22) Filed: Jan. 27, 2010

(65) Prior Publication Data
US 2011/0181887 A1    Jul. 28, 2011

(51) Int. Cl.
*G01C 19/72* (2006.01)
(52) U.S. Cl. ............................................. 356/464
(58) Field of Classification Search .................. 356/459, 356/460, 464, 470, 483
See application file for complete search history.

(56) References Cited

U.S. PATENT DOCUMENTS

| | | | |
|---|---|---|---|
| 4,848,910 A | 7/1989 | Dupraz | |
| 5,080,489 A | 1/1992 | Nishikawa et al. | |
| 5,196,904 A | 3/1993 | Dane et al. | |
| 5,264,914 A | 11/1993 | Oho et al. | |
| 5,708,687 A | 1/1998 | Powell et al. | |
| 6,028,668 A | 2/2000 | Rider | |
| 6,307,411 B1 | 10/2001 | Kerner | |
| 6,445,455 B1* | 9/2002 | Hall et al. | 356/460 |
| 6,744,966 B2 | 6/2004 | Ang et al. | |
| 6,765,678 B2 | 7/2004 | Strandjord et al. | |
| 6,778,279 B2 | 8/2004 | Lange et al. | |
| 7,333,209 B2 | 2/2008 | Greening et al. | |
| 2003/0169428 A1 | 9/2003 | Lange | |
| 2004/0165190 A1* | 8/2004 | Chen et al. | 356/464 |
| 2004/0233456 A1 | 11/2004 | Standjord et al. | |
| 2009/0059237 A1* | 3/2009 | Strandjord et al. | 356/464 |

FOREIGN PATENT DOCUMENTS

| | | |
|---|---|---|
| DE | 4208257 | 6/1993 |
| EP | 0612981 | 8/1994 |
| WO | 0206770 | 1/2002 |

* cited by examiner

*Primary Examiner* — Michael A Lyons
(74) *Attorney, Agent, or Firm* — Fogg & Powers LLC

(57) ABSTRACT

A synchronous fiber optic gyroscope includes a light source, an optical coupler in optical communication with the light source, an optical modulator in optical communication with the coupler, and a fiber optic coil in optical communication with the modulator. A detector is configured to receive an optical signal from the coupler and convert the optical signal to an electrical signal. A loop closure signal processor has a first input configured to receive the electrical signal from the detector. A phase lock loop has an output operatively connected to a second input of the processor. A direct digital synthesizer is operatively coupled to an input of the phase lock loop, with the synthesizer configured to generate a low-frequency signal that is transmitted to the phase lock loop. The phase lock loop converts the low-frequency signal to a high-frequency signal that is transmitted to the second input of the processor, and the phase lock loop provides signal modulation that is synchronous with signal demodulation.

20 Claims, 2 Drawing Sheets

SYNCHRONOUS RADIATION HARDENED FIBER OPTIC GYROSCOPE

STATEMENT REGARDING FEDERALLY SPONSORED RESEARCH OR DEVELOPMENT

Figure 1:
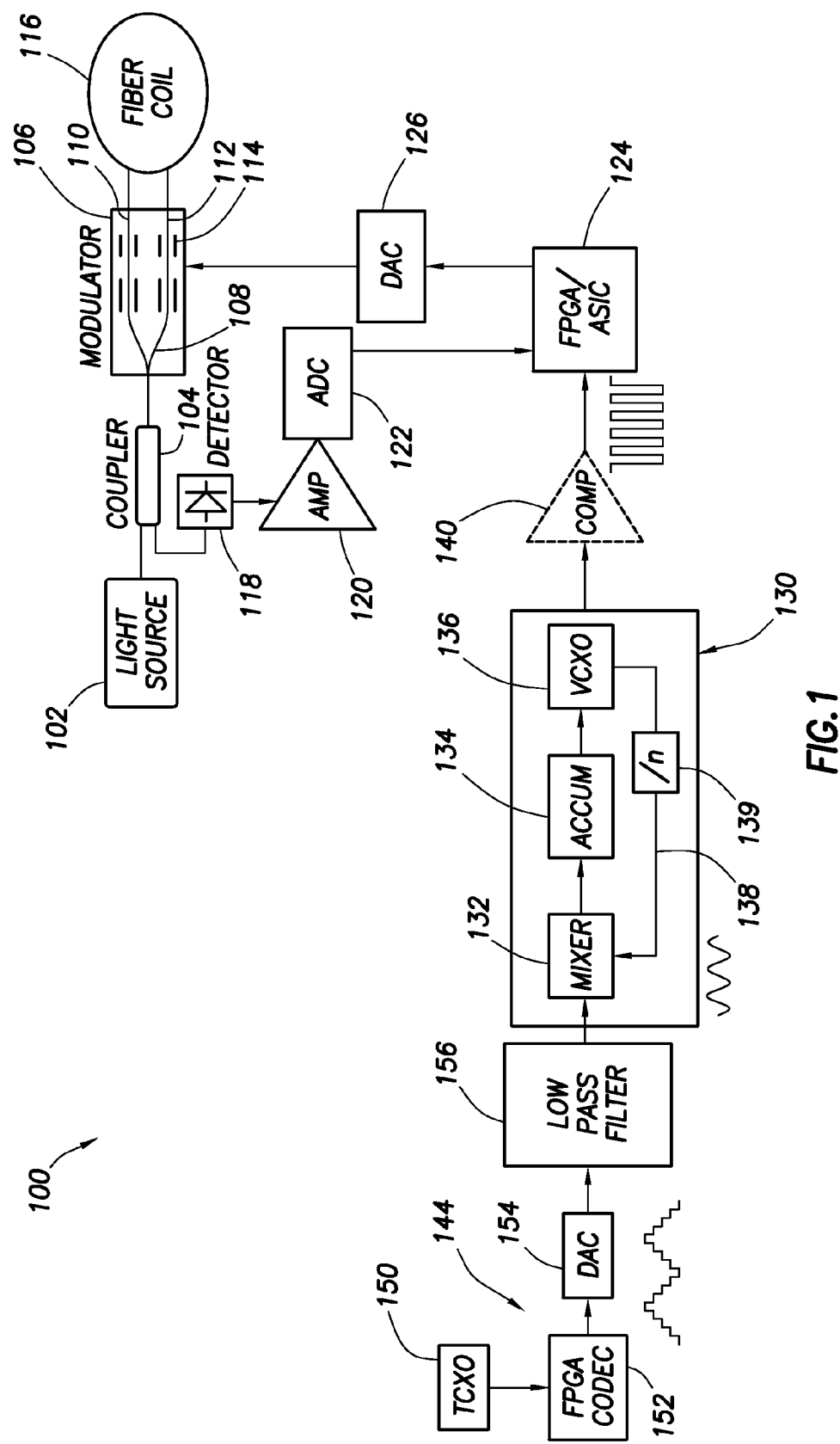

This invention was made with Government support under Contract No. FA9453-08-C-0263 awarded by the Air Force Research Laboratory (AFRL). The Government has certain rights in the invention.

BACKGROUND

A fiber optic gyroscope with counter-propagating electromagnetic waves in a fiber optic coil senses rotation about the coil. Such a fiber optic gyroscope uses a bias modulation to bias the gyroscope on a rate sensitive portion of an interferogram and demodulation to measure and report rotation rates. A bias modulation synchronous with demodulation circuitry provides for the highest sampling efficiency and best gyroscope performance. A synchronous fiber optic gyroscope requires tunable system clocks that are greater than 30 MHz. Such clocks are typically created using commercial off-the-shelf direct digital synthesizers.

Radiation-hardened high performance fiber optic gyroscopes are needed for strategic applications in harsh environments such as outer space. Unfortunately, radiation hardened electrical components cannot operate as fast as commercial parts, therefore requiring radiation hardened fiber optic gyroscope modulation/demodulation circuitry to run asynchronously, resulting in lower performance.

In addition, radiation-hardened direct digital synthesizers are not currently available, and high-speed radiation-hardened digital-to-analog converters, which are needed to create a discrete direct digital synthesizer in the digital domain, are also not available. Therefore, a conventional radiation-hardened fiber optic gyroscope is typically asynchronous, where a low-speed discrete direct digital synthesizer is used to create a low-frequency modulation signal, which is asynchronous to the system clock used to sample the signal at an analog-to-digital converter.

SUMMARY

A synchronous fiber optic gyroscope includes a light source, an optical coupler in optical communication with the light source and configured to receive an optical signal from the light source, an optical modulator in optical communication with the optical coupler, a fiber optic coil in optical communication with the optical modulator, and a detector configured to receive an optical signal from the optical coupler and convert the optical signal to an electrical signal. A loop closure signal processor has a first input, a second input and an output, with the first input of the loop closure signal processor configured to receive the electrical signal from the detector. A phase lock loop has an input and an output, with the output of the phase lock loop operatively connected to the second input of the loop closure signal processor. A direct digital synthesizer is operatively coupled to the input of phase lock loop, with the direct digital synthesizer configured to generate a low-frequency signal that is transmitted to the phase lock loop. The phase lock loop converts the low-frequency signal to a high-frequency signal that is transmitted to the second input of the loop closure signal processor, and the phase lock loop provides signal modulation that is synchronous with signal demodulation. One or more components of the fiber optic gyroscope can be radiation-hardened.

DRAWINGS

Figure 2:
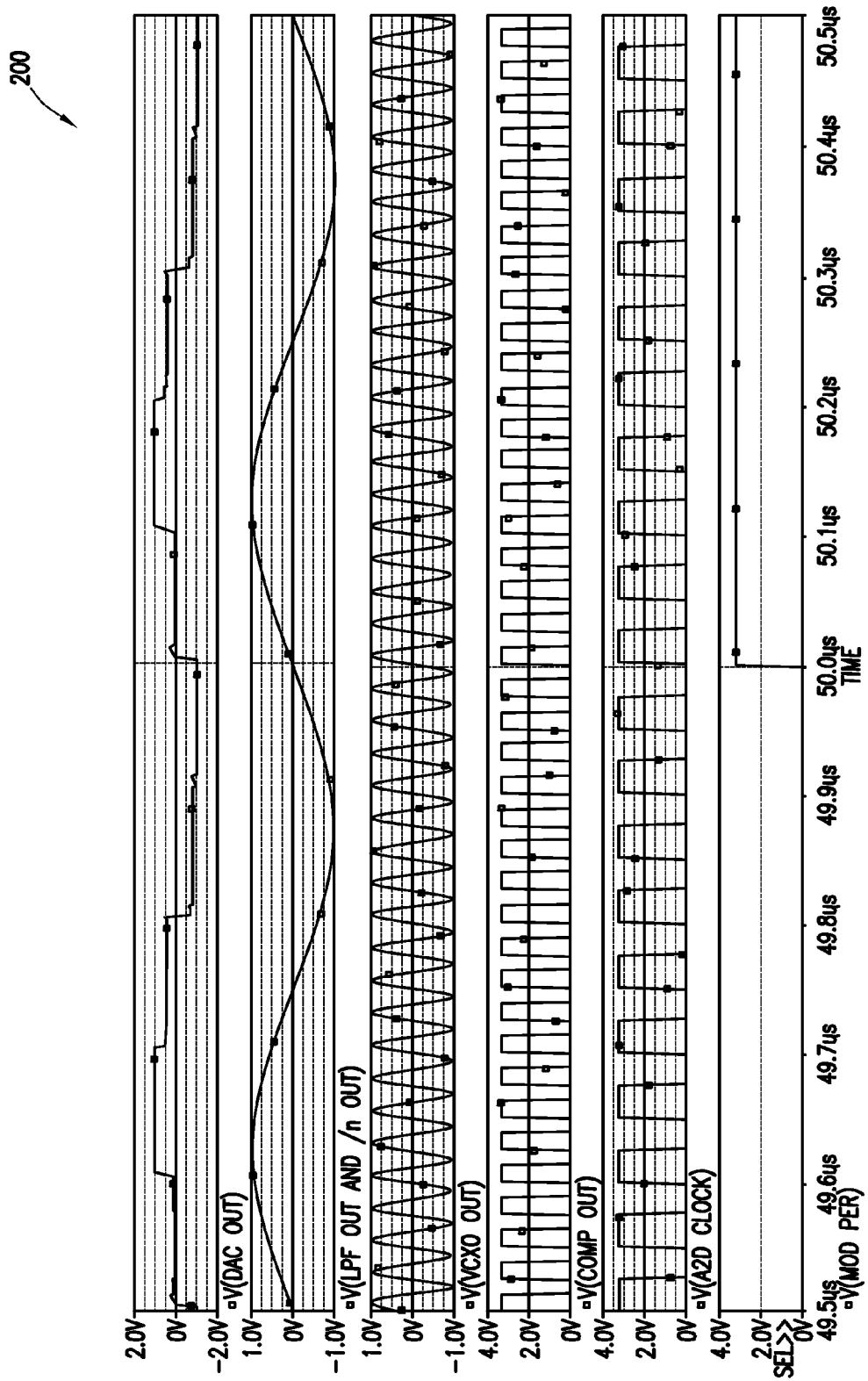

The drawings depict only representative embodiments of the invention and are not to be considered limiting in scope. These embodiments will be described with additional specificity and detail in the following description through the use of the referenced drawings, in which:

FIG. 1 is a block diagram of a fiber optic gyroscope implemented with a phase lock loop according to one embodiment; and FIG. 2 is an exemplary timing diagram of a system clock operation for the fiber optic gyroscope of FIG. 1.

DETAILED DESCRIPTION

In the following detailed description, embodiments are described in sufficient detail to enable those skilled in the art to practice the invention. It is to be understood that other embodiments may be utilized without departing from the scope of the invention. The following detailed description is, therefore, not to be taken in a limiting sense.

The present invention relates to a synchronous fiber optic gyroscope implemented with a phase lock loop. The phase lock loop provides for synchronous modulation and demodulation, yielding high performance of the fiber optic gyroscope. This allows the fiber optic gyroscope to be constructed with radiation-hardened components for operation in harsh radiation environments.

The present fiber optic gyroscope provides for improved demodulation sampling efficiency, resulting in lower angle random walk (ARW) and lower rate/angle white noise, while increasing bias stability. The ARW refers to a noise component (e.g., drift) of the fiber optic gyroscope output. In high performance fiber optic gyroscopes, the ARW is predominately affected by a relative intensity noise (RIN), which results from the random intensity fluctuations of the light used for sensing rotation.

During operation, the present fiber optic gyroscope generates a tunable low-frequency signal (sine wave), such as from a radiation-hardened discrete direct digital synthesizer, then upsamples the low-frequency signal to a high-frequency signal using a phase lock loop, which can also be radiation-hardened. The phase lock loop outputs a signal greater than about 30 MHz, which is used as the system clock and also used to generate a synchronous low-frequency modulation signal, which is sampled using the system clock. The phase lock loop also provides signal demodulation that is synchronous with signal modulation.

The present approach can be synthesized in the digital and analog domain, or in the full digital domain.

FIG. 1 illustrates a fiber optic gyroscope (FOG) 100 implemented with a phase lock loop according to one embodiment. The FOG 100 generally includes a light source 102, an optical coupler 104, an optical modulator 106, a fiber optic coil 116, a detector 118, a loop closure signal processor 124, a phase lock loop 130, and a direct digital synthesizer 144. Each of these components will be discussed in further detail hereafter.

The light source 102 can be any suitable light source for propagating electromagnetic waves through FOG 100. For example, light source 102 can be a pump laser. The light source 102 is in optical communication with optical coupler 104 by using a suitable optical path such as an optical fiber. The light source 102 transmits light to the optical coupler 104, which splits the transmitted light, and further transmits a portion of the light to optical modulator 106 via an optical fiber or other suitable mechanism.

The optical modulator 106, which can be an integrated optical chip, includes a Y-junction 108 and a pair of waveguides 110, 112. Additionally, optical modulator 106 includes a plurality of optical phase modulator electrodes 114 integrated with the waveguides 110, 112. When the light is inside optical modulator 106, the light is further split at Y-junction 108 and fed to waveguides 110, 112. The light in wave guide 110 is transmitted to fiber optic coil 116, where it propagates clockwise around the length of fiber optic coil 116, and returns to wave guide 112. Likewise, the light in wave guide 112 is transmitted to fiber optic coil 116, where it propagates counter-clockwise around the length of fiber optic coil 116, and returns to wave guide 110 in optical coupler 106.

The fiber optic coil 116 is typically wound around a core and about an axis around which rotation is sensed. The fiber optic coil 116 provides a closed optical path in which the light propagates in opposite directions, ultimately impinging on detector 118. Rotation about the sensing axis in one direction causes an effective increase in the optical path length for one direction, and a decrease in the optical path length in the other direction. The optical path length difference introduces a phase shift between the light waves, a result known as the Sagnac effect.

After being transmitted from fiber optic coil 116 and passing through their respective wave guides, the light waves are combined at Y-junction 108 and propagate to the optical coupler 104. The combined light waves are then split and output to detector 118. The detector 118 can be a photodetector, such as an appropriate photodiode and a suitable amplifier, or other suitable detector, which converts the optical signal of the light waves to an electrical signal. The detector 118 outputs the electrical signal, which is proportional to the intensity of the two light waves impinging on detector 118.

The electrical signal output from detector 118, which can be boosted by an amplifier 120, is converted to a digital signal by an analog-to-digital converter (ADC) 122. The digital signal is transmitted to a first input of the loop closure signal processor 124, which can be a field programmable gate array (FPGA), or an application-specific integrated circuit (ASIC). A digital-to-analog converter (DAC) 126 is coupled to an output of loop closure signal processor 124, and transmits an analog signal back to optical modulator 106. In general, signal processor 124 drives optical modulator 106 to a feedback phase shift needed to keep a difference in emitted intensity for the two measurements at zero. Thus, the rotation rate measurement can be calculated from the feedback phase and delivered as an output.

The phase lock loop 130 includes a mixer 132, an accumulator 134, and an oscillator such as a voltage controlled crystal oscillator (VCXO) 136. A feedback loop 138, which includes a frequency divider 139, operatively couples a first output of oscillator 136 with a first input of mixer 132. The high-frequency output of oscillator 136 is divided down to a low-frequency signal using frequency divider 139. This low-frequency signal is phase and frequency locked to the low-frequency signal generated by direct digital synthesizer 144. A second output of oscillator 136 is operatively coupled to a second input of loop closure signal processor 124 through an optional comparator 140, which converts a sine wave from phase lock loop 130 to a square wave. If loop closure signal processor 124 is provided with an input that accepts a sine wave, comparator 140 is not required. The phase lock loop can be constructed with readily available radiation hardened components.

A tunable low-frequency signal (sine wave) is provided in FOG 100 by a discrete direct digital synthesizer 144. The direct digital synthesizer 144 can include a stabilized clock output 150, such as a temperature compensated crystal oscillator (TCXO), a codec (coder-decoder) 152 operatively coupled to clock output 150, and a digital-to-analog converter (DAC) 154 operatively coupled to an output of codec 152. The codec 152 can be implemented in an FPGA in one embodiment. A low pass filter 156, such as an elliptical 5-pole low pass filter, is operatively coupled to an output of DAC 154.

During operation, the direct digital synthesizer 144 generates a tunable low-frequency signal, which is passed through low pass filter 156 to a second input of mixer 132 of phase lock loop 130. The low-frequency signal is mixed with a divided down frequency created by oscillator 136 using frequency divider 139 in the phase lock loop 130, which generates an output signal greater than about 30 MHz that is fed to the second input of loop closure signal processor 124. This output signal is used as the system clock for FOG 100, and is also used to generate a synchronous low-frequency modulation signal, which is sampled by analog-to-digital converter 122 using the system clock.

FIG. 2 is an exemplary timing diagram 200 of the system clock operation of the fiber optic gyroscope disclosed herein. The timing diagram 200 shows the signals for the digital-to-analog converter 154 output (DAC OUT), the low pass filter 156 output (LPF OUT), the frequency divider 139 output (/n OUT), the voltage controlled crystal oscillator 136 output (VCXO OUT), and the comparator 140 output (COMP OUT). The timing diagram 200 also depicts the signals for the analog-to-digital converter 122 clock (A2D CLOCK), and the modulation period (MOD PER). As shown in FIG. 2, the modulation period is synchronized with the analog-to-digital converter clock.

The present invention may be embodied in other specific forms without departing from its essential characteristics. The described embodiments are to be considered in all respects only as illustrative and not restrictive. The scope of the invention is therefore indicated by the appended claims rather than by the foregoing description. All changes that come within the meaning and range of equivalency of the claims are to be embraced within their scope.

What is claimed is:

1. A synchronous fiber optic gyroscope, comprising:
a light source;
an optical coupler in optical communication with the light source and configured to receive an optical signal from the light source;
an optical modulator in optical communication with the optical coupler;
a fiber optic coil in optical communication with the optical modulator;
a detector configured to receive an optical signal from the optical coupler and convert the optical signal to an electrical signal;
a loop closure signal processor having a first input, a second input and an output, the first input of the loop closure signal processor configured to receive the electrical signal from the detector;
a phase lock loop having an input and an output, the output of the phase lock loop operatively connected to the second input of the loop closure signal processor; and
a direct digital synthesizer operatively coupled to the input of the phase lock loop, the direct digital synthesizer configured to generate a low-frequency signal that is transmitted to the phase lock loop;

wherein the phase lock loop converts the low-frequency signal to a high-frequency signal that is transmitted to the second input of the loop closure signal processor, and the phase lock loop provides signal modulation that is synchronous with signal demodulation.

2. The fiber optic gyroscope of claim 1, wherein one or more components of the fiber optic gyroscope are radiation-hardened.

3. The fiber optic gyroscope of claim 1, wherein the light source comprises a laser.

4. The fiber optic gyroscope of claim 1, wherein the loop closure signal processor comprises an application-specific integrated circuit or a field programmable gate array.

5. The fiber optic gyroscope of claim 1, wherein the phase lock loop comprises:
   a mixer having a first input, a second input and an output;
   an accumulator having an input and an output, the input of the accumulator operatively coupled to the output of the mixer;
   an oscillator having an input, a first output and a second output, the input of the oscillator operatively coupled to the output of the accumulator; and
   a feedback loop including a frequency divider that operatively connects the first output of the oscillator with the first input of the mixer.

6. The fiber optic gyroscope of claim 5, further comprising a comparator coupled to the second output of the oscillator.

7. The fiber optic gyroscope of claim 5, wherein the oscillator comprises a voltage controlled crystal oscillator.

8. The fiber optic gyroscope of claim 1, further comprising an analog-to-digital converter configured to convert the electrical signal from the detector to a digital signal.

9. The fiber optic gyroscope of claim 8, wherein the electrical signal from the detector is boosted by an amplifier prior to being converted to the digital signal.

10. The fiber optic gyroscope of claim 8, wherein the digital signal is transmitted to the first input of the loop closure signal processor.

11. The fiber optic gyroscope of claim 1, further comprising a digital-to-analog converter coupled between the output of the loop closure signal processor and an input of the optical modulator.

12. The fiber optic gyroscope of claim 1, wherein the direct digital synthesizer comprises:
   a clock output;
   a codec operatively coupled to the clock output; and
   a digital-to-analog converter operatively coupled to an output of the codec.

13. The fiber optic gyroscope of claim 1, further comprising a low pass filter operatively coupled to an output of the direct digital synthesizer and the second input of the mixer.

14. The fiber optic gyroscope of claim 13, wherein the low pass filter comprises an elliptical 5-pole low pass filter.

15. The fiber optic gyroscope of claim 1, wherein the high-frequency signal is greater than about 30 MHz.

16. A synchronous fiber optic gyroscope, comprising:
   a laser light source;
   an optical coupler in optical communication with the laser light source and configured to receive an optical signal from the laser light source;
   an optical modulator in optical communication with the optical coupler;
   a fiber optic coil in optical communication with the optical modulator;
   a photodetector configured to receive an optical signal from the optical coupler and convert the optical signal to an electrical signal;
   a loop closure signal processor having a first input, a second input and an output, the first input of the loop closure signal processor configured to receive the electrical signal from the photodetector;
   a radiation-hardened phase lock loop having an input and an output, the output of the phase lock loop operatively connected to the second input of the loop closure signal processor; and
   a radiation-hardened direct digital synthesizer operatively coupled to the input of the phase lock loop, the direct digital synthesizer configured to generate a low-frequency signal that is transmitted to the phase lock loop;
   wherein the phase lock loop converts the low-frequency signal to a high-frequency signal that is transmitted to the second input of the loop closure signal processor, and the phase lock loop provides signal modulation that is synchronous with signal demodulation.

17. The synchronous fiber optic gyroscope of claim 16, wherein the phase lock loop comprises:
   a mixer having a first input, a second input, and an output;
   an accumulator having an input and an output, the input of the accumulator operatively coupled to the output of the mixer;
   an oscillator having an input, a first output and a second output, the input of the oscillator operatively coupled to the output of the accumulator; and
   a feedback loop including a frequency divider that operatively connects the first output of the oscillator with the first input of the mixer.

18. The synchronous fiber optic gyroscope of claim 17, further comprising a comparator coupled to the second output of the oscillator.

19. The synchronous fiber optic gyroscope of claim 17, wherein the oscillator comprises a voltage controlled crystal oscillator.

20. The synchronous fiber optic gyroscope of claim 16, further comprising a low pass filter operatively coupled to an output of the direct digital synthesizer and the second input of the mixer.

* * * * *